United States Patent
Finkelstein

(10) Patent No.: US 10,742,448 B2
(45) Date of Patent: Aug. 11, 2020

(54) METHOD FOR SMART DATA ROUTING THROUGH INTERCONNECTED NETWORKS

(71) Applicant: Cox Communications, Inc., Atlanta, GA (US)

(72) Inventor: Jeffrey L. Finkelstein, Atlanta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 87 days.

(21) Appl. No.: 15/210,440

(22) Filed: Jul. 14, 2016

(65) Prior Publication Data
US 2018/0019939 A1    Jan. 18, 2018

(51) Int. Cl.
| | |
|---|---|
| *H04W 24/00* | (2009.01) |
| *H04L 12/66* | (2006.01) |
| *H04W 24/08* | (2009.01) |
| *H04L 29/08* | (2006.01) |
| *H04L 29/06* | (2006.01) |
| *H04L 12/761* | (2013.01) |
| *H04L 12/721* | (2013.01) |
| *H04L 12/715* | (2013.01) |
| *H04W 88/16* | (2009.01) |
| *H04L 12/26* | (2006.01) |

(52) U.S. Cl.
CPC ............ *H04L 12/66* (2013.01); *H04L 45/04* (2013.01); *H04L 45/123* (2013.01); *H04L 45/16* (2013.01); *H04L 69/08* (2013.01); *H04L 69/325* (2013.01); *H04L 69/329* (2013.01); *H04W 24/08* (2013.01); *H04L 43/0894* (2013.01); *H04W 88/16* (2013.01)

(58) Field of Classification Search
CPC ....................................................... H04L 12/66
See application file for complete search history.

(56) References Cited

U.S. PATENT DOCUMENTS

| | | | |
|---|---|---|---|
| 9,444,683 B2* | 9/2016 | Kakadia | H04L 41/0823 |
| 2010/0214920 A1* | 8/2010 | Tewani | H04L 45/22 370/232 |
| 2011/0235542 A1* | 9/2011 | Li | H04L 1/20 370/252 |
| 2012/0093100 A1* | 4/2012 | Qin | H04B 7/10 370/329 |
| 2013/0237237 A1* | 9/2013 | Rahman | H04W 72/085 455/452.1 |

(Continued)

*Primary Examiner* — Brandon M Renner
(74) *Attorney, Agent, or Firm* — Eversheds Sutherland US LLP

(57) ABSTRACT

Embodiments of the present disclosure provide methods, systems, apparatuses, and computer program products facilitating network access. In one embodiment a method is provided comprising accessing a local network according to a first protocol, identifying a first data flow path for accessing a second network, identifying a second data flow path for accessing the second network, wherein accessing the second network over the second data flow path comprises accessing one or more intermediate networks according to a second protocol, segmenting the data into a first portion and a second portion based on one or more criteria, accessing the second network according to the second protocol and providing the first portion of the data from the first device to the second device over the second data flow path.

18 Claims, 10 Drawing Sheets

(56) References Cited

U.S. PATENT DOCUMENTS

| | | | |
|---|---|---|---|
| 2014/0192698 A1* | 7/2014 | Anchan | H04W 4/06 |
| | | | 370/312 |
| 2014/0280708 A1* | 9/2014 | Maltz | H04L 67/02 |
| | | | 709/217 |
| 2015/0055654 A1* | 2/2015 | Song | H04L 45/34 |
| | | | 370/392 |
| 2015/0221193 A1* | 8/2015 | Pragada | G06K 9/00771 |
| | | | 348/153 |
| 2016/0234099 A1* | 8/2016 | Jiao | H04L 45/02 |
| 2016/0285746 A1* | 9/2016 | Parron | H04L 45/245 |
| 2017/0164263 A1* | 6/2017 | Lindoff | H04W 40/12 |
| 2017/0316435 A1* | 11/2017 | Leung | G06Q 30/0202 |
| 2018/0242383 A1* | 8/2018 | Horn | H04W 76/15 |

\* cited by examiner

US 10,742,448 B2

METHOD FOR SMART DATA ROUTING THROUGH INTERCONNECTED NETWORKS

BACKGROUND

A wide variety of service providers, such as cable providers and satellite providers, may connect user devices to one or more networks such as the Internet. Residences may include a local wireless network that allows wireless devices within the residence to access the Internet. A provider may provide Internet access to a residence via a head-end that includes a computer system and databases required for provisioning of Internet access. The head-end may include cable modem termination system (CMTS), which sends and receives digital cable modem signals on a cable network to provide Internet services to cable subscribers. However, the residence may experience issues such as congestion, speed losses, pricing spikes, service interruptions that degrade the user experience. Accordingly, there is a strong need in the market for systems and methods that remedy the aforementioned problems and challenges.

BRIEF DESCRIPTION OF THE DRAWINGS

Figure 1:
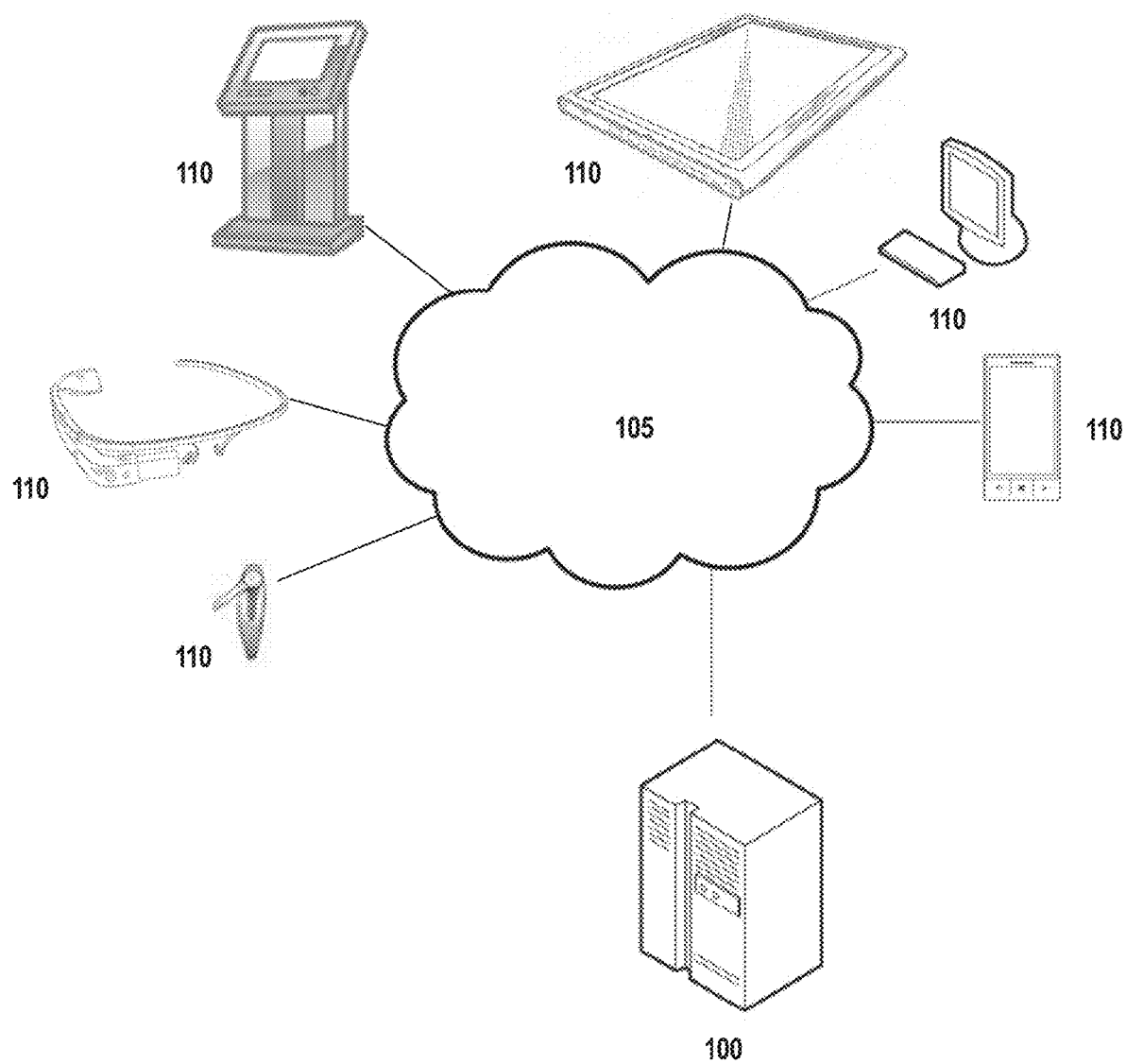
Figure 2:
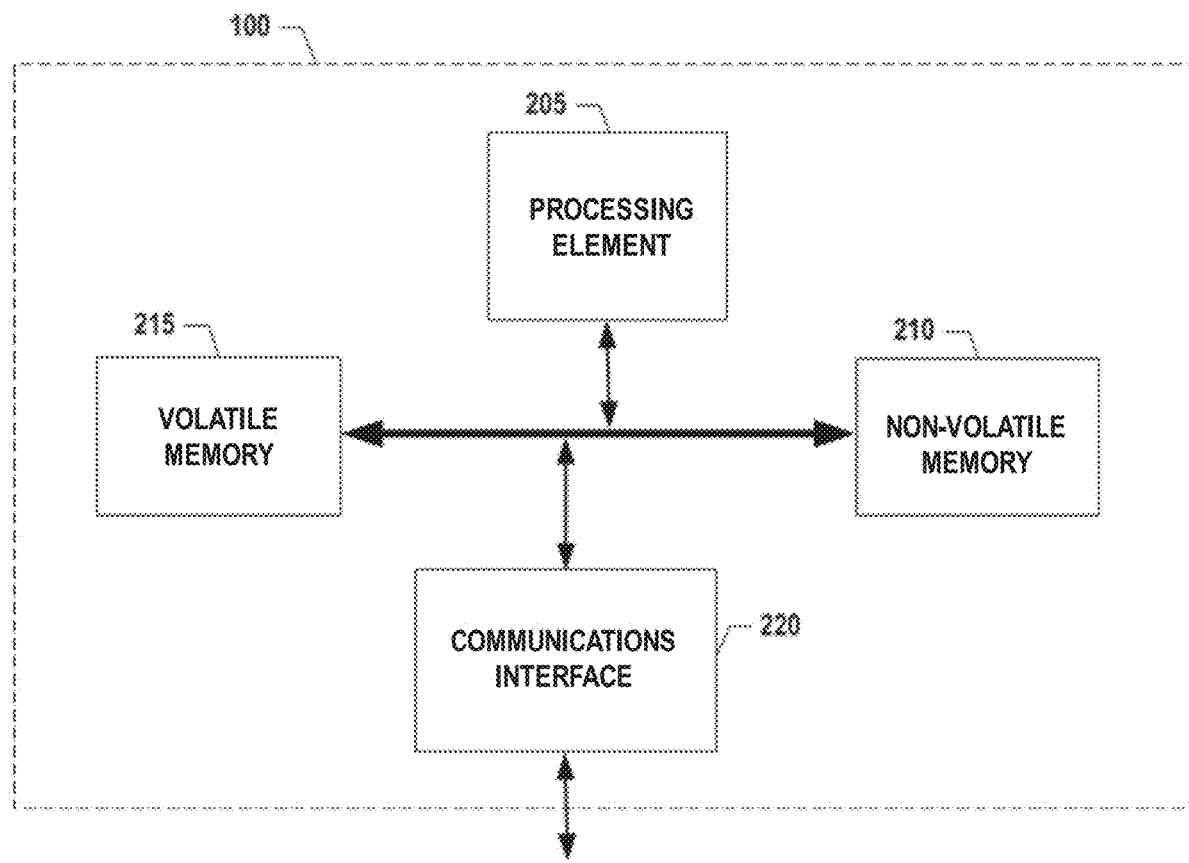
Figure 3:
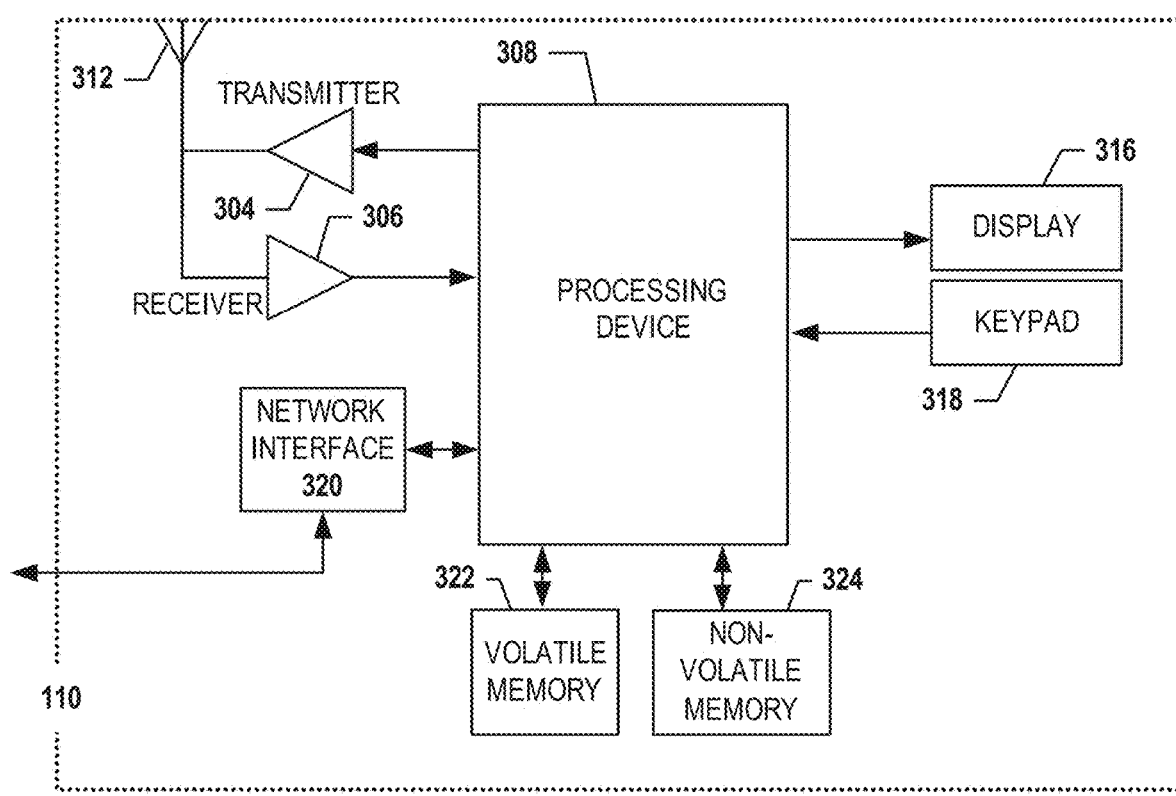
Figure 4:
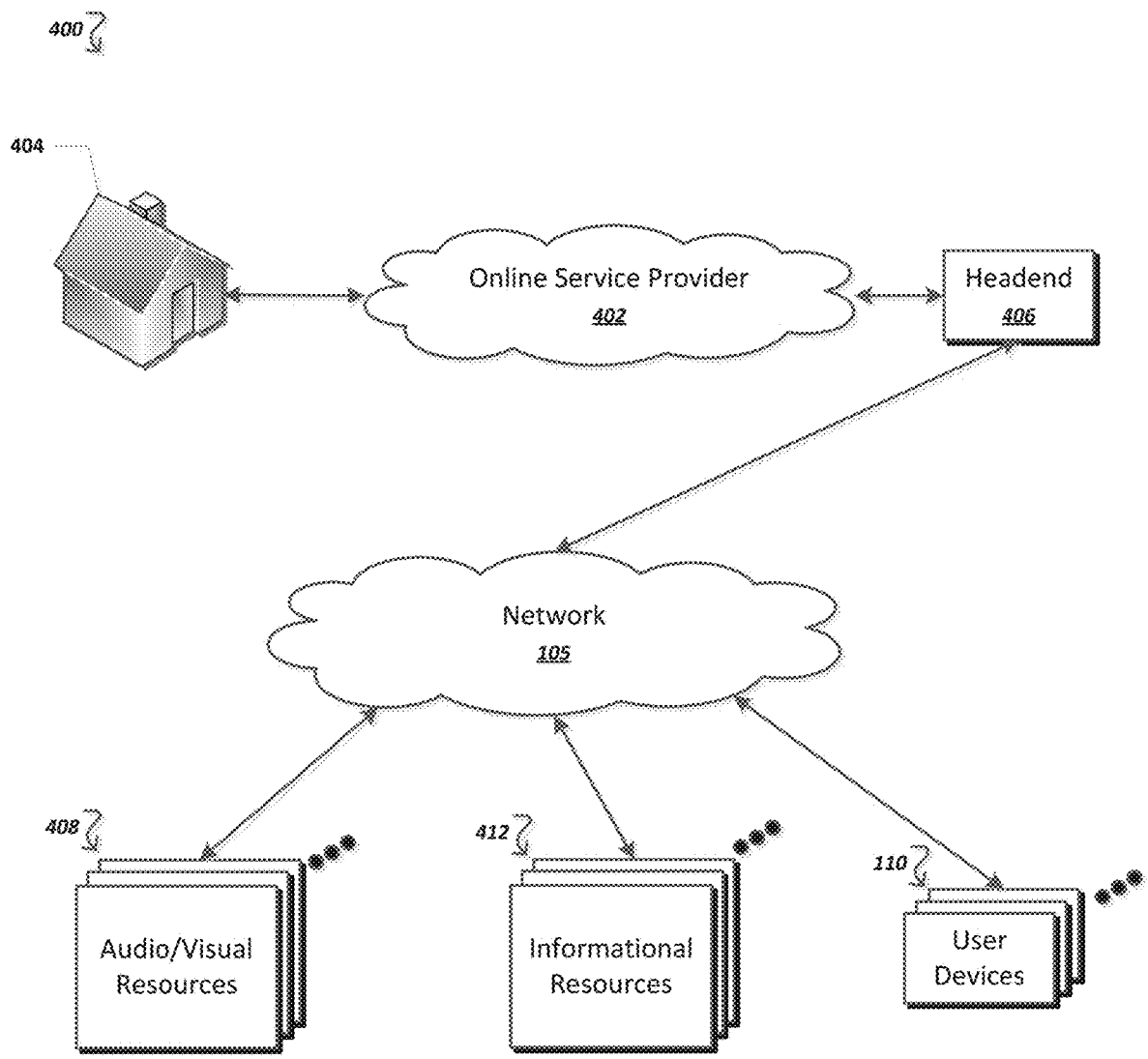
Figure 5:
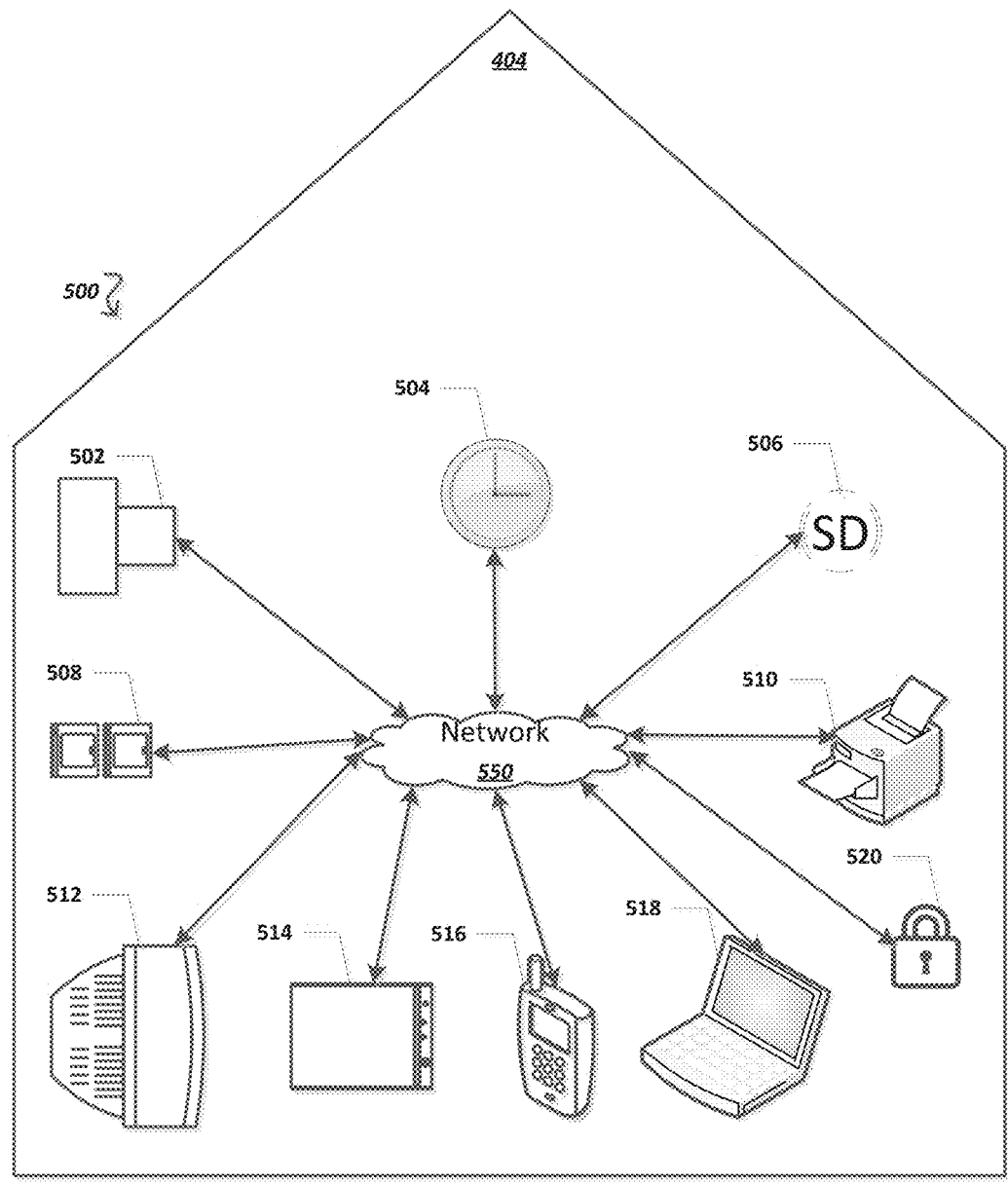
Figure 6:
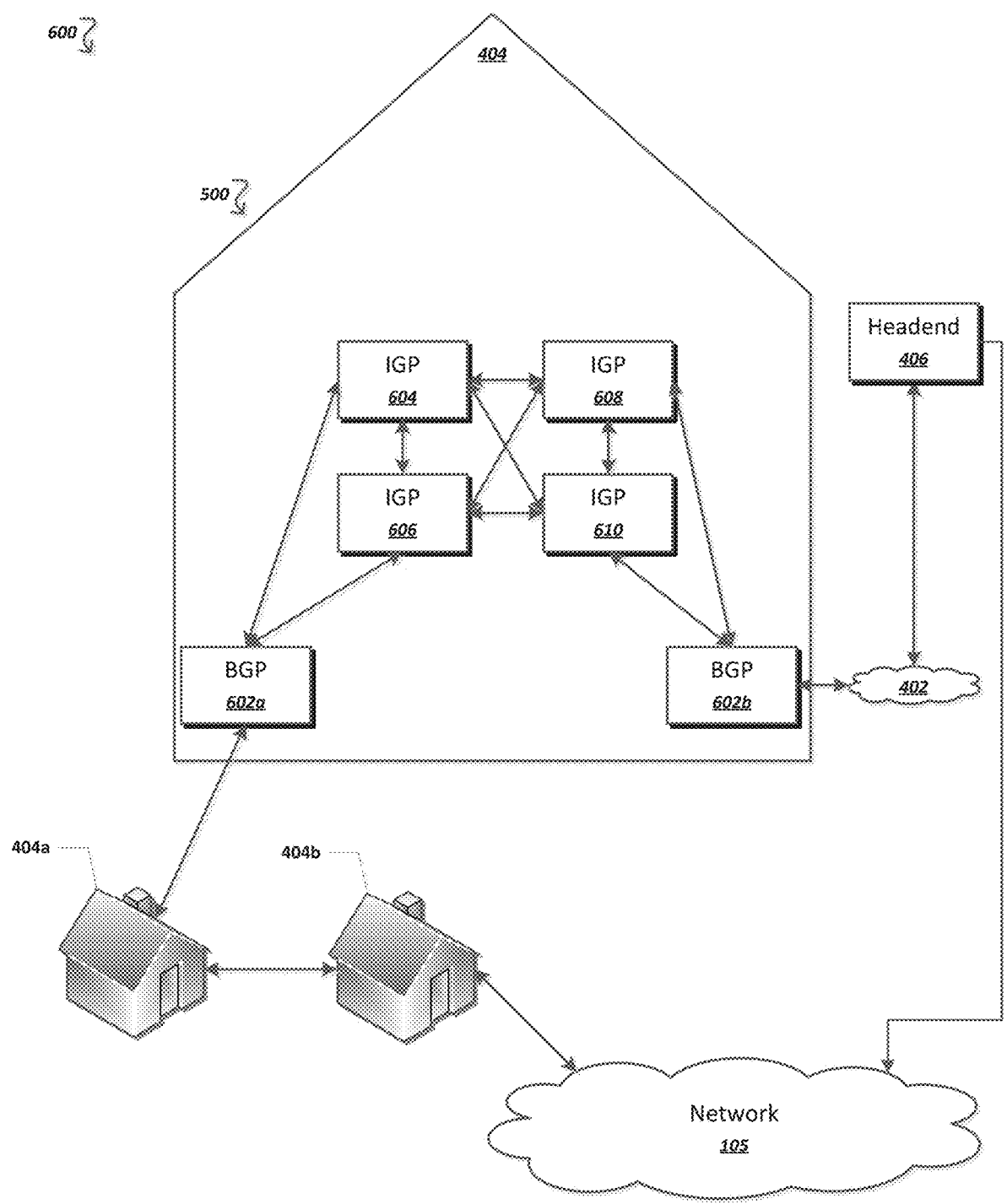
Figure 7A:
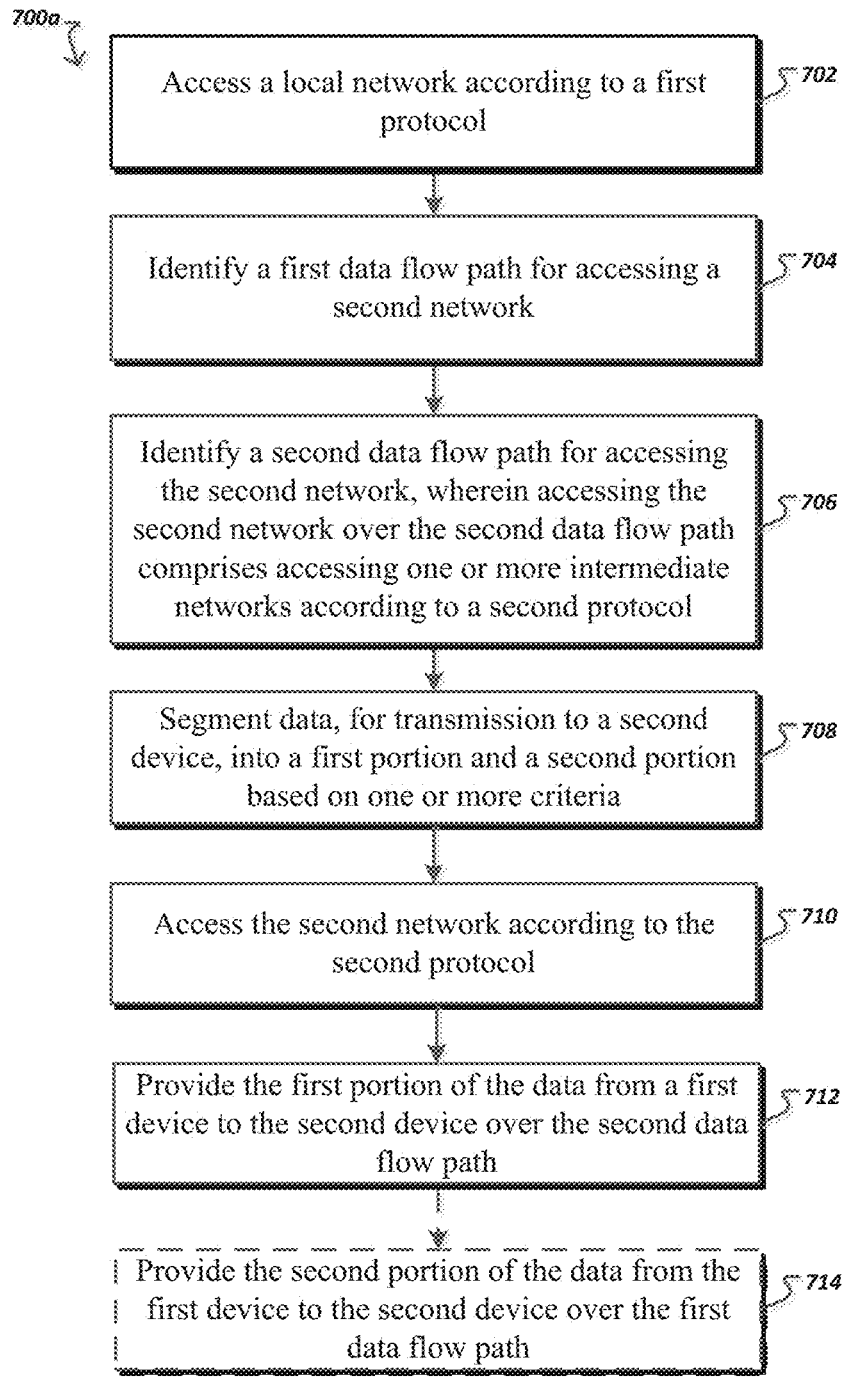
Figure 7B:
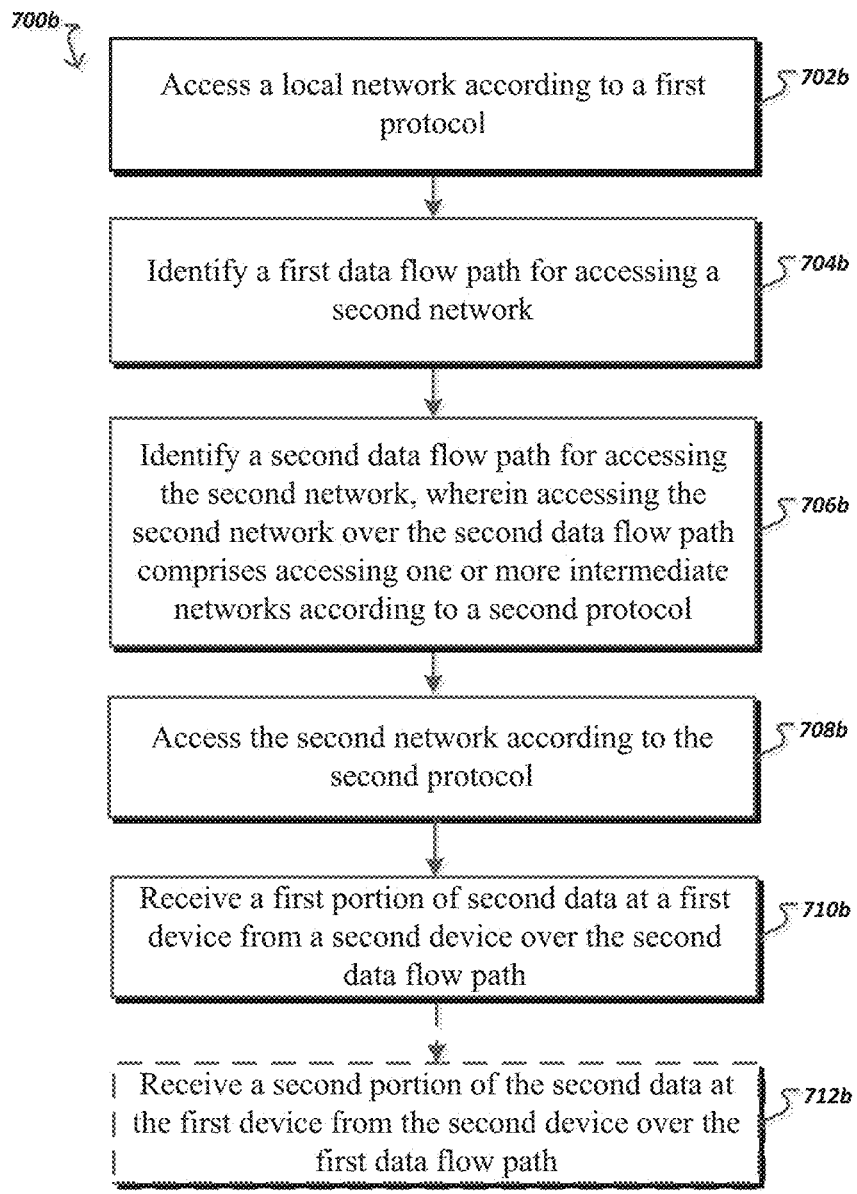
Figure 7C:
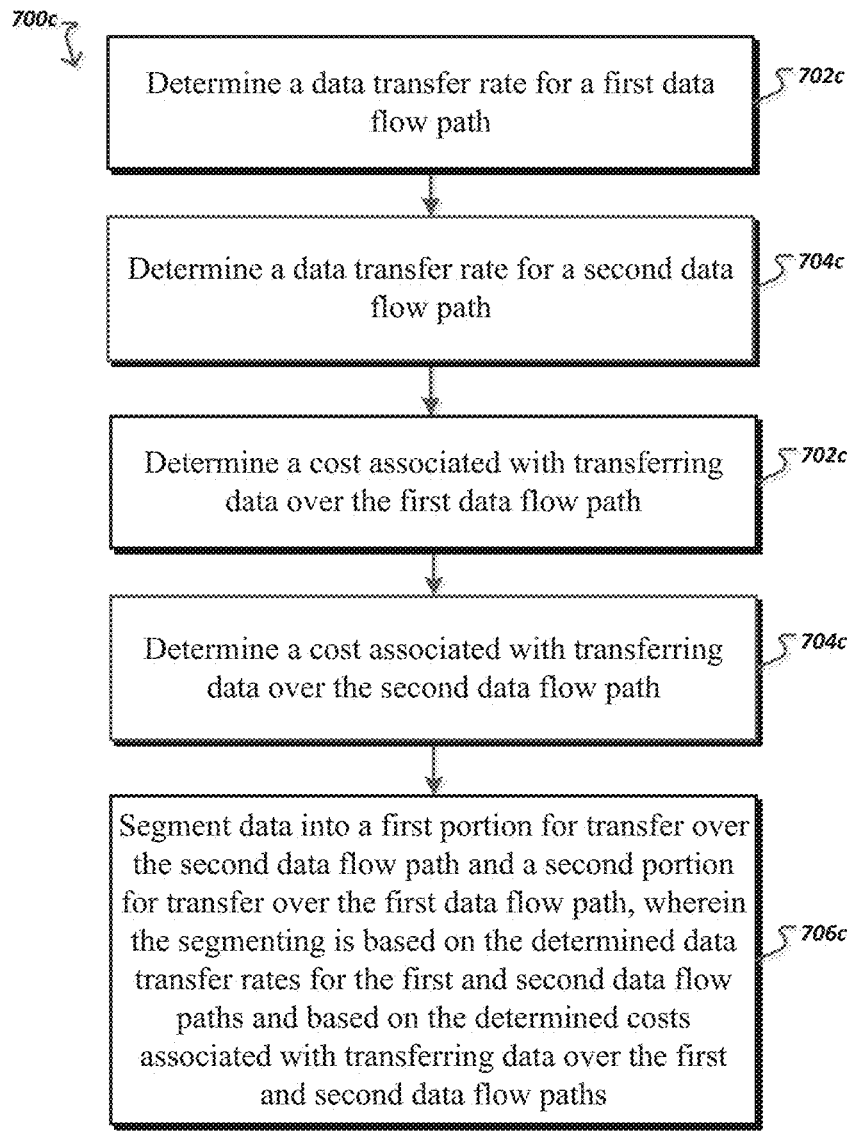
Figure 8:
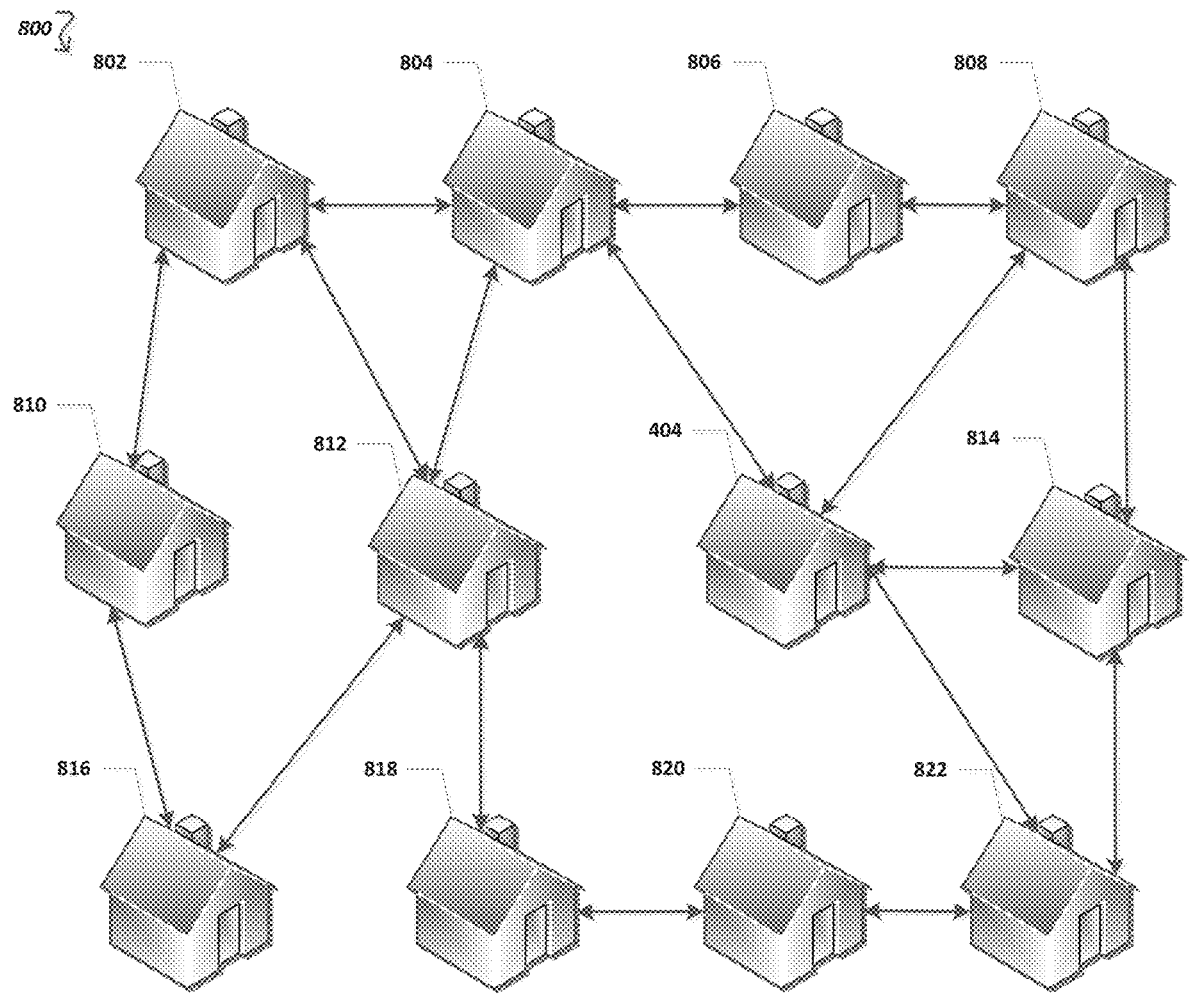

Having thus described the disclosure in general terms, reference will now be made to the accompanying drawings, which are not necessarily drawn to scale, and wherein:

FIG. 1 is an overview of a system that can be used to practice embodiments of the present disclosure;

FIG. 2 is an example schematic diagram of a management computing entity according to one embodiment of the present disclosure;

FIG. 3 is an example schematic diagram of a user device according to one embodiment of the present disclosure;

FIGS. 4-6 illustrate example data flow according to various embodiments of the disclosure;

FIGS. 7A-7C are flow charts illustrating various procedures and operations that may be completed in accordance with various embodiments of the present disclosure; and FIG. 8 illustrates an example network layout, in accordance with embodiments of the present disclosure.

DETAILED DESCRIPTION OF VARIOUS EMBODIMENTS

This specification relates system and method for providing network access to one or more devices.

In general, one innovative aspect of the subject matter described herein can be embodied in methods that include the actions of accessing a local network according to a first protocol, identifying a first data flow path for accessing a second network, identifying a second data flow path for accessing the second network, wherein accessing the second network over the second data flow path comprises accessing one or more intermediate networks according to a second protocol, segmenting data, for transmission to a second device, into a first portion and a second portion based on one or more criteria, accessing the second network according to the second protocol, and providing the first portion of the data from a first device to the second device over the second data flow path.

Other embodiments of this aspect include corresponding systems, apparatus, and computer programs, configured to perform the actions of the methods, encoded on computer storage devices.

These and other embodiments can each optionally include one or more of the following features. Providing the second portion of the data from the first device to the second device over the first data flow path.

In general, another aspect of the subject matter described herein can be embodied in methods that include the actions of determining a data transfer rate for the first data flow path, determining a data transfer rate for the first data flow path, segmenting the data into the first portion for transfer over the second data flow path and a second portion for transfer over the first data flow path, wherein the segmenting is based on the determined data transfer rates for the first and second data flow paths.

Other embodiments of this aspect include corresponding systems, apparatus, and computer programs, configured to perform the actions of the methods, encoded on computer storage devices.

These and other embodiments can each optionally include one or more of the following features. Determining a cost associated with transferring data over the first data flow path, determining a cost associated with transferring data over the first data flow path, and segmenting the data into the first portion for transfer over the second data flow path and a second portion for transfer over the first data flow path, wherein the segmenting is based on the determined costs associated with transferring data over the first and second data flow paths.

Particular embodiments of the subject matter described herein can be implemented so as to realize one or more of the following advantages. Improve network stability and operational data transfer rates and, in turn, improve the user experience. Reduce the costs associated with routing network traffic. Provide redundant network access routes and, in turn, eliminate or reduce service interruptions. Expand the network coverage for user devices, such that users can access the network at various locations outside a primary local network of the user. Receiving a first portion of second data at the first device from the second device over the second data flow path. Receiving a second portion of the second data at the first device from the second device over the first data flow path. Accessing second network according to an OpenFlow protocol.

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

I. Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Example System Architecture

FIG. 1 provides an illustration of an example embodiment of the present disclosure. As shown in FIG. 1, this particular embodiment may include one or more management computing entities 100, one or more networks 105, and one or more user devices 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Example Management Computing Entity

FIG. 2 provides a schematic of a management computing entity 100 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user devices 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for example purposes only and are not limiting to the various embodiments.

2. Example User Device

A user may be an individual, a family, a company, an organization, an entity, a department within an organization, a representative of an organization and/or person, and/or the like. In one example, users may be employees, residents, customers, and/or the like. For instance, a user may operate a user device 110 that includes one or more components that are functionally similar to those of the management computing entity 100. FIG. 3 provides an illustrative schematic representative of a user device 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the user device 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the management computing entity 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the management computing entity 100 via a network interface 320.

Via these communication standards and protocols, the user device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (e.g., including executable instructions, applications, program modules), and operating system.

According to one embodiment, the user device 110 may include location determining aspects, devices, modules, functionalities, and/or similar words used herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 110 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 110 to interact with and/or cause display of information from the management computing entity 100, as described herein. The user input interface can comprise any of a number of devices or interfaces allowing the user device 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the management computing entity 100 and/or various other computing entities.

In another embodiment, the user device 110 may include one or more components or functionality that are the same or similar to those of the management computing entity 100, as described in greater detail above. As will be recognized, these architectures and descriptions are provided for example purposes only and are not limiting to the various embodiments.

III. Example System Operation

As described above, the management computing entity 100 may be configured to facilitate access of the internet and/or a network through one or more networks according to one or more architectures or configurations. In some implementations, management computing entity 100 may be configured to select one or more routes for providing internet and/or network access to user device 110. The selection may be based on one or more routing criteria. For example, the selection may be based on data transfer rates associated with respective routes, costs associated with respective routes and/or the like.

Management computing entity 100 and/or user device 110 may facilitate configuration of the routing criteria described above. For example, a user interface may be accessible from a user device 110 (e.g., in communication with the management computing entity 100) for configuring the routing criteria. For example, in various embodiments, a user may log in to the management computing entity 100 from a user device 110 (e.g., by opening a log-in page and entering a user ID and password using display 316 and keypad 318). The management computing entity 100 may be configured to recognize any such log-in request, verify that user has permission to access the system (e.g., by confirming the user ID and password are valid), and present/provide the user with a user interface (e.g., displayed on display 316). In other embodiments, user log-in is not required to access the user interface. Yet in other embodiments, the user may access the user interface for configuring the routing criteria directly via management computing entity 100.

In some embodiments, the management computing entity 100 may include components that facilitate the receipt, processing, and/or output of at least one broadband signal, such as a broadband cable signal or a broadband satellite signal (e.g., network devices). In some implementations, the management computing entity 100 may be a customer premise device or component that is situated within a customer's household or other structure associated with the customer. The management computing entity 100 may include suitable hardware and/or software components capable of receiving and processing a broadband signal (e.g., a cable signal, satellite signal, etc.) received over the service provider network(s), such as a cable service provider network or a satellite service provider network. Examples of suitable components may include, but are not limited to, a set-top box ("STB") (e.g., a cable STB, a digital satellite STB, an Internet Protocol Television STB, etc.), a virtual STB, an embedded STB, etc. Other examples of the user devices 110 may include tablet computing devices, laptop computers, desktop computers, smartphones, wearable devices, combinations thereof, or the like. The user devices 110 may further include one or more applications. The applications may be software components utilized for sending and/or receiving content and/or data over the service provider network(s) between the user devices 110.

For example, the applications may include, without limitation, video streaming applications for communicating video (and associated audio) data, voice over IP (VoIP) applications for communicating voice data, and web (i.e., Internet) applications for communicating web or business data. In certain embodiments, one of the network devices (e.g., the user device 110) may be associated with the service provider network(s) for providing content to a customer network device (e.g., the user device 110). For example, the user device 110 may be configured to receive a broadband signal from the service provider network(s) that may include a wide variety of data components, including but not limited to, a television signal, a digital television signal, data associated with a VoIP telephone service, data associated with Internet service, data associated with business services, etc. The user device 110 may receive and process the broadband signal. The user device 110 may selectively output a portion of the broadband signal, such as digital television data (e.g., audio and/or video data), electronic program guide data, various Web pages, etc., to a display device (not shown) for display. Any number of suitable connections and/or connecting devices, such as coaxial cables, High-Definition Multimedia Interface ("HDMI") cables, etc., may be utilized to connect the user device 110 to the aforementioned display device.

In some embodiments, the user devices 110 may receive a broadband data signal and/or content via any number of suitable service provider network(s), such as a cable network that includes any number of optical fibers, coaxial cables, and/or cable drops, a satellite network that includes a suitable satellite dish and/or connecting cables, and/or other suitable networks. Additionally, any number of intermediary devices, such as broadband modems, routers, etc., may be situated between each of the user devices 110 and the service provider network(s).

The management computing entity 100 may be configured to receive router status information and control the operation of routers in the service provider network(s) and/or local network(s). The management computing entity 100 may route (and/or reroute) network traffic flows based on one or more routing criteria. The routing criteria may include various metrics for making alternate path selections (e.g., by selecting an optimum network traffic path) when rerouting data through the service provider network(s) between the user devices 110. In one embodiment, the routing criteria may be based on a time/byte count threshold. For example, the routing module may be configured to use one path for creating a data flow and then reroute the data flow upon reaching a certain time/byte count threshold (e.g., >100.000 data packets over a two hour time period). In example embodiments, the management computing entity may approximately distribute across various data pathways according to the dataflow capacity of each of the various data pathways. In other embodiments, the routing criteria may be based on a type of data flow such as video data, business data, voice data, and web data. For example, the management computing entity may be configured to reroute a data flow containing video data only onto a particular data flow paths optimized for transmitting video data. Thus, the management computing entity may attempt to reroute data flow on a pathway that may be optimized for that data flow, before rerouting to pathways that may be optimized for other data types and/or data streams.

It should be understood that in accordance with embodiments of the disclosure, the management computing entity 100 may be configured to be aware of network capacity, bandwidth, and traffic associated with the flow of data over the service provider network(s) as well as to determine a cost associated with the transmission of data. Specifically, the management computing entity may be configured to determine a least costly network traffic or data flow path (comprised of one or more routers) for communicating data between the user devices 110. For example, if a user device 110 is in the process of sending video data to a second user device 110 over the service provider network(s) and among two available network traffic paths, only one network traffic path is configured to carry video data (e.g., the network traffic path is subject to a service load agreement (SLA) that includes specific performance benchmarks for the transmission of video data), then the management computing entity 100 may determine that the network traffic path configured to carry video data (i.e., the optimum traffic path) has the least cost with respect to the other available network traffic path. However, in other cases, if there are relatively high levels of congestion on the path configured to carry video data, then the management computing entity may identify an alternate pathway that provides a relatively low cost transmission of data. It will be appreciated that cost, as discussed herein, may entail any variety of metrics associated with transmitting data between user devices 110 via the service provider network(s). These metrics may include cost per bit, data latency cost, data bandwidth cost, customer satisfaction cost, combinations thereof, or the like.

In accordance with an embodiment of the disclosure, the management computing entity 100 may comprise a software-defined networking (SDN) module that performs at least the above-described functions. As should be appreciated by those skilled in the art, SDN is an approach to computer networking that allows network administrators to manage network services through abstraction of higher-level functionality. This is accomplished by decoupling the system that makes decisions about where traffic is sent (the control plane) from the underlying systems that forward traffic to the selected destination (the data plane). In one embodiment, communication between the control plane and the data plane may be accomplished through the use of a protocol such as OpenFlow. As known to those skilled in the art, OpenFlow is a communications protocol that gives access to the forwarding plane of a network switch or router over the network. The OpenFlow protocol is layered on top of the Transmission Control Protocol (TCP), and prescribes the use of Transport Layer Security (TLS). Specifically, the OpenFlow protocol enables controllers to determine the path of network packets through a network of switches or routers. The separation of the control plane from the forwarding plane allows for more sophisticated traffic management than is feasible using access control lists (ACLs) and routing protocols. The OpenFlow protocol also allows remote administration of a layer 3 switch's or router's packet forwarding tables, by adding, modifying and removing packet matching rules and actions. It will be appreciated that in other example embodiments, any other suitable protocols may be employed for the purposes of control plane-to-data plane and/or data plane-to-control plane communications. In this manner, routing decisions may be made periodically or ad hoc by the management computing entity 100 and translated into rules and actions with a configurable lifespan, which are then deployed to a switch or router's flow table, leaving the actual forwarding of matched packets to the switch or router at wire speed for the duration of those rules. Packets which are unmatched by the switch or router may be forwarded to the controller. The management computing entity 100 can then decide to modify existing flow table rules on one or more switches/routers or to deploy new rules, to prevent a structural flow of traffic between switch/router and controller. The controller may even decide to forward the traffic itself, provided that it has told the switch or router to forward entire packets instead of just their header.

It should be understood however, that other SDN protocols may also be utilized in accordance with embodiments of the disclosure. Other protocols which may be utilized include, without limitation, Border Gateway Protocol (BGP), NETCONF, Extensible Messaging and Presence Protocol (XMPP), Open vSwitch Database Management Protocol (OVSDB), and MPLS Transport Profile (MPLS-TP).

FIG. 4 depicts an example architecture 400 providing access to the internet or a network. In the illustrated example, architecture 400 allows complex 404 and/or user computer devices 110 access to the internet or a network 105. In some implementations, complex 404 may be a house, a residential building, a business and/or the like. Complex 404 may, for example, access audio/visual resources 408, informational resource 412 through the data flow route. Similarly, complex 404 may be in communication with user devices 110 through the depicted data flow route. Online services providers may provide access to headend 406 via wired or wireless online service provider network 402. In some implementations, online service provider network 402 may be a cable network that facilitates communication between complex 404 and headend 406. In some implementations, online service provider network 402 may be a wireless network that facilitates communication between complex 404 and headend 406 and/or other aggregators suitable for wireless networks. In some implementations, headend 406 may be a control center in a cable system for receiving, processing and distributing signals over a cable and/or a wireless network. In some implementations, headend 406 may be replaced with other aggregators and management devices and systems.

In turn, headend 406 may facilitate communication between complex 404 and the network 105 via the illustrated data flow route. The network 105 may be, for example, the internet. In some implementations, the network 105 facilitates access of various resources and devices. For example, the network 105 may facilitate access to Audio/visual resources 408 and/or informational resources 412. In one example, user devices 110 and 110 may access Audio/visual resources 408 and/or informational resources 412 via network 105. Similarly, communication may be established between user devices 110 and 110 via network 105 and the depicted data flow route. A plurality of user devices 110 may be connected to a local network within complex 404, as will be described in more detail with reference to FIG. 5. The user devices 110 may access network 105 according to the data flow route described above.

FIG. 5 depicts local network 550 (e.g., LAN) with environment 500 within example complex 404. The local network 550 may be connected to and in communication with online service provider network 402. In some implementations, access to network 550 may be provided according to an IPV4 or an IPV6 protocol. Various devices (not shown) may facilitate hosting the network. For example, routers, modems, wired and wireless access points, top boxes and/or the like may be used.

Various user devices may be connected to the network 550. In some implementations, an automated and/or electronically controlled HVAC system 502 may be connected to network 550. In some implementations, an automated and/or electronically controlled digital clock or smart watch 504 may be connected to network 550. In some implementations, an automated and/or electronically controlled smoke detector 506 may be connected to network 550. Similarly, automated and/or electronically controlled appliances such as washers and dryers 508 may be connected to network 550. In some implementation, a wired and/or wireless printer 510 may be connected to network 550. In some implementations a smart and/or automated lock 520 may be connected to network 550. Similarly, user devices 110 (e.g., laptop 518 and/or mobile device 516) may also be connected to network 550. In some implementations, a cable box 514 and/or smart television 512 may also be connected to network 550.

The network 550 may facilitate communication between the above mentioned devices. For example, the network 550 may facilitate communication between mobile device 516 and HVAC system 502 to change the thermostat temperature. Similarly, network 550 may facilitate communication between laptop 518 and smart TV 512 to stream audio/visual data from laptop 518. The network 550 may facilitate communication between the above mentioned devices and network 105 and/or the internet. For example, an application may be executed at smart TV 512 or laptop 518 to cause streaming of audio/visual resources 408 (e.g., movie, TV show, music and/or the like) for display at smart TV 512 or laptop 518. In some implementations, the above mentioned devices may access network 550 and/or network 105 through one or more intermediate devices. For example, mobile device 516 may access network 550 and/network 105 through laptop 518. In one example, laptop 518 may be in communication with network 550 and mobile device 516, such that laptop 518 is responsible for transmitting and receiving communications between mobile device 516 and network 550.

FIG. 6 depicts an example architecture 600 providing access to the internet or a network, according to an embodiment of the disclosure. The illustrated data flow depicts example data flow routes for accessing network 105 and/or the internet. The local environment 500 shows example data flow within complex 404 and is generally similar to the environment described with reference to FIG. 5. Similarly, the data flow route that provides access to network 105 through headend 406 and online service provider network 402 is generally similar to the data flow route described with reference to FIG. 4.

Interior gateway protocol (IGP) may be used for exchanging routing information between different gateways (e.g., routers) within environment 500. For example, one or more interconnected network, similar to network 550, may be active within environment 500. In some implementations, hot-zones or smaller networks may be hosted by computing entities 100 within environment 500. In some implementations, multiple networks may be hosted by one or more routes within environment 500. For example, a route may host a 2.4 GHz network and 5 GHz network simultaneously. The router may also facilitate communication between the two networks.

In one example, IGP gateway 604 may be an access point for network 550. In one example, IGP gateway 606 and IGP gateway 608 may be access points for a different 2.4 GHz network (not shown) and a different 5 GHz network (not shown) respectively. In one example, IGP gateway 610 may be a gateway for hot-zone or smaller network hosted by user devices 110 (e.g., laptop 518) within environment 500.

Border gateway protocol (BGP) or Exterior gateway protocol (EGP) may be used for exchanging routing information within environment 600. In some implementations, BGP may be used for exchanging routing information within environment 600 but outside environment 500. The BGP protocol may be a path vector protocol or a distance-vector routing protocol that is making routing decisions based on paths, network policies, and/or rules or criteria defined by a user (e.g., network administrator). It should be understood that the criteria discussed herein may be implemented using the BGP protocol. In one example, BGP gateway 602b may facilitate access to online service provider network 402 according to one or more BGP protocols. In one example, BGP gateway 602a may facilitate access to a neighboring local network within complex 404a according to one or more BGP protocols or variations. In one example, BGP gateway 602a may facilitate access to a neighboring local network within complex 404b, through a network within complex 404a, according to one or more BGP protocols. In one example, BGP gateway 602a may facilitate access network 105 through one or more neighboring networks, such as networks within complexes 404a and 404b.

FIG. 6 shows multiple data flow routes for accessing network 105. For example, a device may access network 105 through IGP gateway 604, IGP gateway 610, BGP gateway 602b, online service provider network 402, followed by headend 406. Alternately, a device may access network 105 through IGP gateway 604, BGP gateway 602a, followed by neighboring local networks within complexes 404a and 404b.

The selected data flow route may affect various performance metrics associated with accessing the network via the selected data flow route. For example, a first route utilizing BGP gateway 602b to access the network may be associated with lower transfer rates, higher delays, and/or higher data losses relative to a second route utilizing BGP gateway 602a. In this described example, management computing entity 100 may select the first route utilizing BGP gateway 602a to access network 105. The selection may, for example, be based on one or more criteria based on transfer rates, delays, data or packet losses and/or cost. In one example, a selection criterion may be based on minimizing the cost. In one implementation, a selection criterion may be based on maximizing the data transfer rates. In some implementations, the selection criteria may be a combination of both the cost criterion and the data transfer rate criterion. In one implementation, network 105 may be accessed according to an OpenFlow protocol. In some implementations, may collect information from network equipment (e.g., routers, switches and/or the like). For example, the management computing entity 100 may receive and store transfer rate data from the network equipment. In some implementations, the management computing entity 100 may receive and store cost data from different online service providers. In turn, the management computing entity 100 may calculate different performance metrics associated with different data paths. For example, the management computing entity 100 may determine performance metrics associated with transferring data via network 402 and headend 406. Similarly, the management computing entity 100 may determine performance metrics associated with transferring data via networks within complex 404a and complex 404b. In some implementations, the management computing entity 100 may compare the metrics associated with each path to determine how to segment and route data to network 105. In some implementations, different criteria may be associated with different performance metrics. One example, criterion may be to minimize the cost. A different example criterion may be to maximize the transfer rates or minimize the time required for transferring a set of data. In some implementations, the criteria may be combined and assigned different weights. For example, the minimizing the cost may be assigned a weight that is twice that of maximizing transfer rates. Multiple algorithms may be used to facilitate the routing operations described herein. In some examples, the algorithms for enforcing the criteria described above may be embedded in in the OpenFlow and/or BGP protocol. In some examples, the managing computing entity may be embedded in one or more network equipment.

FIG. 7A is flow charts process 700a in accordance with various embodiments of the present disclosure. The process 700a begins with accessing a local network according to a first protocol (702). For example, the process 700a may begin with accessing a local network 550 according to an IGP protocol. As described with reference to FIG. 6, accessing the local network may be through one or more intermediate networks and/or devices. In some implementations, the process 700a may begin with accessing network 402 and/or network 105 through network 402 according to an OpenFlow protocol.

The process 700a continues with identifying a first data flow path for accessing a second network (704). For example, process 700a may identify a first route utilizing BGP gateway 602b for accessing network 105. The process 700a continues with identifying a second data flow path for accessing the second network, wherein accessing the second network over the second data flow path comprises accessing one or more intermediate networks according to a second protocol (706). For example, the process 700a may identify a second route utilizing BGP gateway 602a for accessing network 105. The second route may include one or more intermediate networks such as the local networks within 404a and 404b. In some implementations, intermediate networks (e.g., networks within complex 404a and 404b) may be accessed according to a BGP protocol and/or an OpenFlow protocol. In some implementations, the second path includes a plurality of intermediate networks arranged in Mesh formation. For example, complexes 404a and 404b may be replaced by the example mesh network depicted in FIG. 8.

FIG. 8 illustrates an example network layout, in accordance with embodiments of the present disclosure. Complex 404 may be connected to a variety of intermediate local networks within other complexes directly or indirectly (e.g., 802-822). It should be understood that the depicted connections between complexes denoted bi-directional communications or bi-directional communication capabilities. FIG. 6 depicts a signal path for accessing network 105 through intermediate local networks for simplicity. It should be understood that generally the mesh network of intermediate networks includes multiple (e.g., hundreds, thousands, millions and/or the like) different data flow paths for accessing network 105. Each data flow path may be associated with different performance metrics (e.g., cost, transfer rates, delays and/or the like). Selection of the optimal data flow path may be based on such performance metrics. One data flow path may go through the networks of complex 404, followed by complex 822, followed by complex 820, followed by complex 818, followed by complex 812, followed by complex 816 and network 105 (not shown). Alternatively, a different data flow path may go through the networks of complex 404, followed by complex 804, followed by complex 812, followed by complex 816 and network 105 (not shown).

The architecture of FIG. 8 provides redundant access to network 105, for example. That is if a local network of complex 804 is down or experiencing service interruptions, a data flow route that does not pass through the network of complex 804 may be selected for accessing network 105. According to architecture of FIG. 8, a user may utilize mesh network 800 to access network 105 via online service provider network 402.

The process 700a may continue with segmenting data, for transmission to a second device, into a first portion and a second portion based on one or more criteria (708). For example, the first data flow path may be associated with lower data transfer rates than the second data flow path. In such example, the management computing entity 100 may segment the data into a first portion for transmission over the second data flow path and a second portion for transmission over the first data flow path. Since, the first data flow path is associated with lower data transfer rates, the management computing entity 100 may segment the data such that the second portion is larger than the first portion. According to the data transfer rate maximization and/or a speed of transmission criteria, for transmitting data over the first and second data flow routes, the overall time for transferring the data may be less than transferring the data over only the first data flow path or only the second data flow path. A different criterion may be used to segment the data. For example, a cost criterion may be used to segment the data. In one example, the cost associated with transmitting the data using the second route is less than the cost associated with transmitting the data using the first route. Accordingly, the process 700a may segment the data into a first portion and a second portion. In some implementations, the second portion may include all of the data and the first portion includes no data. Therefore, transferring the data through the second data flow route may minimize the costs of transmission.

The process 700a may continue with accessing the second network according to the second protocol. In one example, the process 700a may continue with accessing one or more intermediate network or network 550 according to a BGP protocol (710). In turn, the process 700a may continue with providing the first portion of the data from a first device to the second device over the second data flow path (712). It should be understood that the segmenting above is performed such that one or more criteria are satisfied during transmission. For example, the transmitting all of the data over the second data flow path may insure that the costs associated with the transmission are minimized. It should also be understood, that the performance attributes associated with each data flow route may constantly be changing. Therefore, the segmentation may be performed periodically or frequently based on current performance attributes and/or metrics. The process 700a may continue with optional step 714 shown in phantom. The process 700a may continue with providing the second portion of the data from the first device to the second device over the first data flow path (714). In some implementations, the data in its entirety is provided through either the first data flow path or the second data flow path in order to satisfy the above mentioned criteria. In some implementations, a portion of the data is transferred through the first data flow path and the remaining portion is transmitted through the second data flow path in order to satisfy the above mentioned criteria.

FIG. 7B is flow charts process 700b in accordance with various embodiments of the present disclosure. The process 700b begins with accessing a local network according to a first protocol (702b). The process 700b continues with identifying a first data flow path for accessing a second network (704b). In turn, the process 700a continues with identifying a second data flow path for accessing the second network, wherein accessing the second network over the second data flow path comprises accessing one or more intermediate networks (706b). The process 700a may continue with segmenting data, for transmission to a second device, into a first portion and a second portion based on one or more criteria (708b). The above steps are generally similar to the respective steps described above with reference to FIG. 7A. However, in some implementations the segmentation of data, described above, is performed by a computing entity associated with management network 105. In some implementations, the segmentation is performed by management computing entity 100 and instructions are provided to a management device associated with network 105 or routing external traffic to provide a portion of the data over a first data flow path and a remaining portion of the data over a second data flow path.

The process 700b may continue with receiving a first portion of second data at the first device from a second device over the second data flow path (710b). Finally, the process 700 may continue with optional step 712b shown in phantom. The process 700 may continue with receiving a second portion of the second data at the first device from the second device over the first data flow path (712b).

It should be understood that processes 700a and 700b may be combined and/or performed simultaneously to establish bi-directional communication between networks and devices.

FIG. 7C is flow charts process 700c in accordance with various embodiments of the present disclosure. The process 700c begins with determining a data transfer rate for a first data flow path (702c). For example, the process 700c may determine a data transfer rate (e.g., Mbs/sec, bytes/sec and/or the like) for the first data flow path described above. The process 700c may similarly, determine a data transfer rate for a second data flow path (704c). For example, the process 700c may determine a data transfer rate (e.g., Mbs/sec, bytes/sec and/or the like) for the second data flow path described above (704c).

The process 700c may continue with determining a cost associated with transferring data over the first data flow path (702c). For example, the process 700c may determine a cost or a rate associated with transferring data over the first data flow path described above. Similarly, the process 700c may determine a cost associated with transferring data over the second data flow path (704c). For example, the process 700c may determine a cost or a rate associated with transferring data over the second data flow path described above.

In turn, the process 700c continues with segmenting data into a first portion for transfer over the second data flow path and a second portion for transfer over the first data flow path, wherein the segmenting is based on the determined data transfer rates for the first and second data flow paths and based on the determined costs associated with transferring data over the first and second data flow paths (706c). In some implementations, the management computing entity 100 may determine how to best satisfy multiple criteria simultaneously. For example, the management computing entity 100 may determine how to segment the data such that the associated cost of transferring the data is minimized while the data transfer rate for transferring the data is maximized. Additional criteria may also be considered. For example, one or more criteria associated with data losses, transfer time, likelihood of service interruption and/or the like may also be considered during segmentation and selection of data flow routes or paths.

It should be understood that the more than two data flow paths or routes may be available for transferring the data. For example, as shown in FIG. 8 there are multiple routes that may be used to transmit the data and each is associated with different performance metrics or attributes. Therefore, the management computing entity 100 may be responsible for determining various performance metrics for each route within mesh network 800. In some implementations, such calculations are performed by management computing entity 100 and/or one or more computing entities in communication with management computing entity 100.

It should be understood that processes 700a, 700b and 700c may be combined and/or performed simultaneously to establish bi-directional communication between networks and devices according to one or more selection criteria.

In some implementations, management computing entity 100 may employ machine learning to segment the data and select one or more routes for transmitting the segmented data. For example, machine learning algorithms may be used to determine one or more optimal routes for accessing network 105 according to a plurality of criteria.

These performance attributes and others may be computed periodically (e.g., daily, weekly, and monthly) for each route. Clustered or the non-clustered attributes may be used to train a machine learning model. It should be understood that the selection of attributes or clusters of attributes for training machine learning models for optimization processes can greatly affect the respective performance. In some implementations, attributes and/or clusters of attributes are selected based on statistical analysis associated with the optimization. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and exclude the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model. Yet in other implementations, the attributes may be selected by a user as described herein.

In some implementations, the route selection process is performed according to a random forest model. The model may operate by constructing multiple decision trees at training. Each decision tree may be based on different attributes. In some implementations, the random forest model output is the mode of routes or the most occurring routes or sections of routes among all the trees of the random forest. In some implementations, the random forest model is trained with historical data associated with various attributes and/or routes. In some implementations, different trained models may be utilized for different locations and/or types of routes and/or complex.

IV. Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

V. Conclusion

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer implemented method comprising:
accessing a local network according to a first protocol;
identifying a first data flow path for accessing a second network;
identifying a second data flow path for accessing the second network, wherein accessing the second network over the second data flow path comprises accessing one or more intermediate networks according to a second protocol;
segmenting data, for transmission from a first device to a second device, into a first portion and a second portion based on a first criteria associated with a first performance metric of the first data flow path and a second criteria associated with a second performance metric of the second data flow path, wherein:
segmenting the data is performed dynamically based on an assessment of the first criteria, and the second criteria; and
a first weight is assigned to the first criteria, and a second weight is assigned to the second criteria;
accessing the second network according to the second protocol;
determining, based on the first criteria and the second criteria, and between the first data flow path and the second data flow path, to send the first portion of the data from the first device to the second device over the second data flow path;
providing the first portion of the data from the first device to the second device over the second data flow path;
determining, based on the first criteria and the second criteria, and between the first data flow path and the second data flow path, to send the second portion of the data from the first device to the second device over the first data flow path; and
providing the second portion of the data from the first device to the second device over the first data flow path.

2. The method of claim 1, wherein segmenting the data is performed based at least in part on an indication that a current assessment of the first criteria has changed relative to a previous assessment of the first criteria.

3. The method of claim 1, wherein the first criteria comprise a cost based criteria.

4. The method of claim 1, wherein the first criteria comprise a data transfer based criteria that indicates a threshold amount of data within a first period of time to include in the first portion.

5. The method of claim 1, further comprising:
determining a data transfer rate for the first data flow path;
determining a data transfer rate for the second data flow path; and segmenting the data into the first portion for transfer over the second data flow path and a second portion for transfer over the first data flow path, wherein the segmenting is based on the determined data transfer rates for the first and second data flow paths.

6. The method of claim 1, further comprising:
determining a cost associated with transferring data over the first data flow path;
determining a cost associated with transferring data over the second data flow path; and
segmenting the data into the first portion for transfer over the second data flow path and a second portion for transfer over the first data flow path, wherein the segmenting is based on the determined costs associated with transferring data over the first and second data flow paths.

7. The method of claim 1, further comprising receiving a first portion of second data at the first device from the second device over the second data flow path.

8. The method of claim 7, further comprising receiving a second portion of the second data at the first device from the second device over the first data flow path.

9. The method of claim 1, wherein accessing the second network over the first data flow path comprises accessing the second network according to an OpenFlow protocol.

10. The computer implemented method of claim 1, wherein the first criteria is associated with the a first optimization of the first performance metric and the second criteria is associated with a second optimization of the second performance metric, and wherein the first optimization of the first performance metric is a maximization or minimization of the first performance metric, and the second optimization of the second performance metric is a maximization or minimization of the second performance metric.

11. A system, comprising:
a data processing apparatus;
one or more network routing devices in communication with the data processing apparatus; and
a computer memory apparatus in data communication with the data processing apparatus and storing instructions executable by the data processing apparatus and that upon such execution cause the data processing apparatus to perform operations comprising:
accessing a local network according to a first protocol;
identifying a first data flow path for accessing a second network;
identifying a second data flow path for accessing the second network, wherein accessing the second network over the second data flow path comprises accessing one or more intermediate networks according to a second protocol;
segmenting data into a first portion and a second portion based on a first criteria associated with a first performance metric of the first data flow path and a second criteria associated with a second performance metric of the second data flow path, wherein:
segmenting the data is performed dynamically based on an assessment of the first criteria and the second criteria; and
a first weight is assigned to the first criteria and a second weight is assigned to the second criteria;
accessing the second network according to the second protocol;
determining, based on the first criteria and the second criteria, and between the first data flow path and the second data flow path, to send the first portion of the data over the second data flow path;
providing the first portion of the data over the second data flow path;
determining, based on the first criteria and the second criteria, and between the first data flow path and the second data flow path, to send the second portion of the data over the first data flow path; and
providing the second portion of the data over the first data flow path.

12. The system of claim 11, wherein the segmenting the data is performed based at least in part on an indication that a current assessment of the first criteria has changed relative to a previous assessment of the first criteria.

13. The system of claim 11, wherein the first criteria comprises a cost based criteria and a data transfer based criteria.

14. The system of claim 11, wherein the operations further comprise:
determining a data transfer rate for the first data flow path;
determining a data transfer rate for the second data flow path; and
segmenting the data into the first portion for transfer over the second data flow path and a second portion for transfer over the first data flow path, wherein the segmenting is based on the determined data transfer rates for the first and second data flow paths.

15. The system of claim 11, wherein the operations further comprise:
determining a cost associated with transferring data over the first data flow path;
determining a cost associated with transferring data over the second data flow path; and
segmenting the data into the first portion for transfer over the second data flow path and a second portion for transfer over the first data flow path, wherein the segmenting is based on the determined costs associated with transferring data over the first and second data flow paths.

16. The system of claim 11, wherein the operations further comprise receiving a first portion of second data over the second data flow path and receiving a second portion of the second data over the first data flow path.

17. The system of claim 11, wherein the first protocol is an IGP protocol, the second protocol is a BGP protocol and accessing the second network over the first data flow path comprises accessing the second network according to an OpenFlow protocol.

18. A computer program product comprising at least one non-transitory computer-readable storage medium having computer-readable program code portions stored thereon that, when executed by a computing device, cause the computing device to perform operations comprising:
accessing a local network according to a first protocol;
identifying a first data flow path for accessing a second network;
identifying a second data flow path for accessing the second network, wherein accessing the second network over the second data flow path comprises accessing one or more intermediate networks according to a second protocol;
segmenting data into a first portion and a second portion based on a first criteria associated with a first performance metric of the first data flow path and a second criteria associated with a second performance metric of the second data flow path, wherein:
segmenting the data is performed dynamically based on an assessment of the first criteria and the second criteria, a first weight is assigned to the first criteria, and
a second weight is assigned to the second criteria;
accessing the second network according to the second protocol;
determining, based on the first criteria and the second criteria, and between the first data flow path and the second data flow path, to send the first portion of the data over the second data flow path;
providing the first portion of the data over the second data flow path;
determining, based on the first criteria and the second criteria, and between the first data flow path and the second data flow path, to send the second portion of the data over the first data flow path; and
providing the second portion of the data over the first data flow path.

* * * * *